March 16, 1948. S. D. POOL 2,437,891
FLEXIBLE COUPLING
Filed Jan. 19, 1945
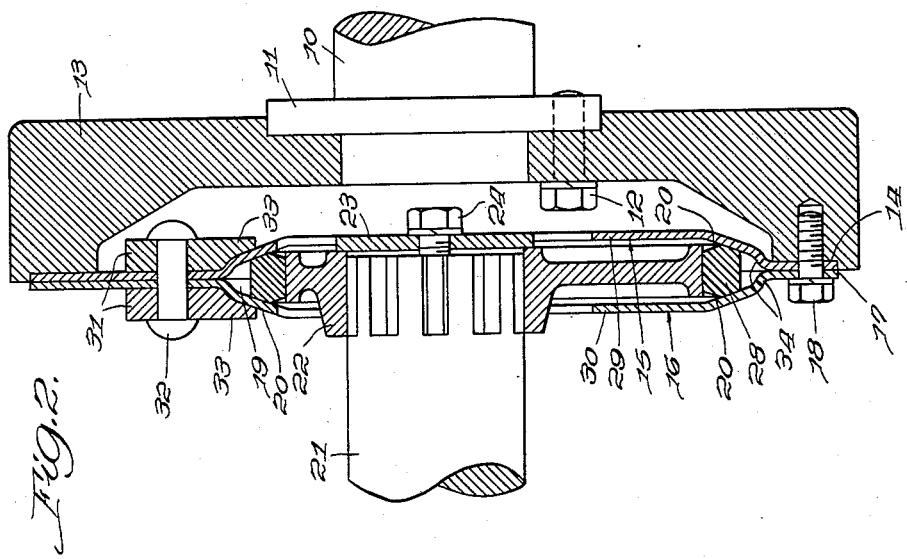
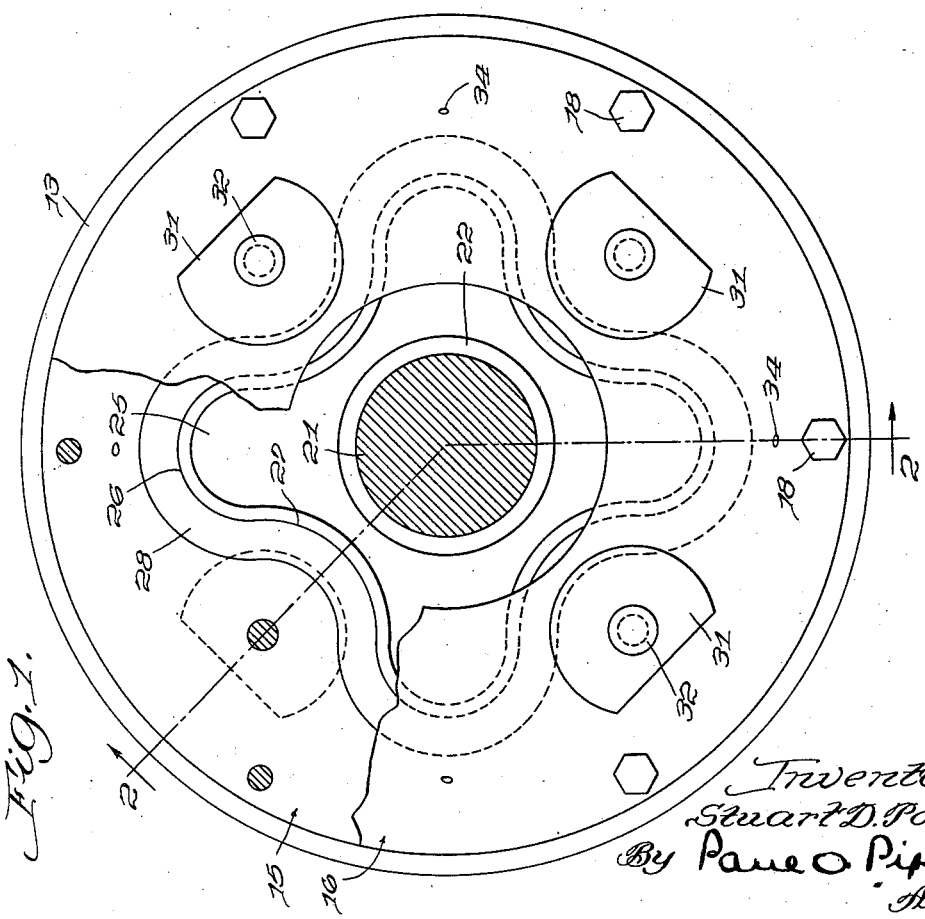
Inventor:
Stuart D. Pool.
By Paul O. Pippel
Atty.

UNITED STATES PATENT OFFICE 2,437,891

FLEXIBLE COUPLING

Stuart D. Pool, Moline, Ill., assignor to International Harvester Company, a corporation of New Jersey Application January 19, 1945, Serial No. 573,542

5 Claims. (Cl. 64—14)

This invention relates to a flexible coupling. More specifically it relates to a yieldable power transmitting coupling for transmitting power from one rotating member to another concentrically mounted rotatable member.

In the mounting of power transmission members in concentric relation, it is very difficult to maintain perfect alinement as the axes for the independently mounted members may be at a slight angle with respect to each other despite precision manufacturing, and also if the rotatable members are carried by different supporting structures, the axes are apt to be slightly out of alinement and in parallel relation with respect to each other. Various coupling devices have been designed to take care of both types of misalinement. There are also problems in the transmission of power, particularly from sources such as internal combustion engines or other sources where torsional vibration is encountered which requires some shock-absorbing means such as a resilient or flexible coupling. The principal object of the present invention is to provide an improved flexible coupling capable of taking small amounts of angular misalinement and of off-set misalinement in the axes in two substantially alined shafts. Another object is to provide a flexible drive coupling incorporating a band of uniform cross section as the yielding power transmitting element. Another specific object is to utilize a power transmitting element having the form of a V-belt and in using the angled side walls to clamp the power transmitting member into position in a resilient coupling. The above objects and others which will be apparent from the detailed description to follow are accomplished by a construction such as shown in one embodiment in the drawing.

Figure 1 is an end elevation of a coupling device; and

Figure 2 is a section taken substantially on the line 2—2 of Figure 1.

The drawings show a coupling incorporating the invention as utilized for connecting a coaxial power shaft to the crank shaft of an internal combustion engine. This is one of the constructions in which it is very desirable to have a vibration absorbing coupling in order to take up the torsional vibrations due to the action of the cylinders on the crank-shaft of the engine. It is also desirable because of the necessity for securing supporting means for the power shaft to the fly-wheel housing of the engine. It is difficult to maintain true coaxial alinement when mounting one casting upon another in the manner required for such a supporting means.

A portion of a shaft 10 is shown which, as above pointed out, may be the crank-shaft of an internal combustion engine. Said shaft is provided with an annular flange 11 which is secured by cap screws 12 to an annular member 13 which in the case of an engine is the fly-wheel for the engine. Said fly-wheel is provided with an annular recess 14 which provides means for mounting a coupling incorporating the invention. Said coupling includes an outer generally annular structure made up of two mating plates 15 and 16. To facilitate manufacture, said plates are identical. By reversing the plates with respect to each other, the rim portions 17 may be abutted and secured by cap screws 18 in the recess 14 of the fly-wheel 13. Said outer structure as made up by the plates 15 and 16 is formed with a sinuous internal recess 19. Said recess is formed by sinuous inclined side walls 20 connected with the rim portions 17. The inclined walls 20 slant toward each other in a radial outward direction.

A power transmitting shaft 21 is arranged in axial alinement with the shaft 10. As previously pointed out this alinement is as nearly a true one as manufacturing tolerances may permit. Such misalinement as may occur is taken care of by the resiliency of the coupling. A hub member 22 is splined on the end of the shaft 21 for rotation therewith, being held on said shaft by an overlapping plate 23 and a cap screw 24 threaded into the end of the shaft 21.

The hub member 22 is provided with a plurality of equally spaced, radially extending projections 25. There may be any number of these projections, four being shown. Said projections are formed on their outer surfaces with curved or cylindrical surfaces 26. Said surfaces are joined with a smooth contour to similarly curved or cylindrical surfaces 27 which form valleys between the projections 25. The projections and the surfaces therefor form a sinuous surface symmetrically around the axis of the hub member 22.

The third element of the coupling, in addition to the outer structure consisting of the plates 15 and 16 and the inner structure consisting of the hub member 22, is a continuous member in the form of a belt 28. As shown, said belt has the cross section of a conventional double V-belt as used for driving pulleys where each side of the belt engages a V-pulley. Said belt may be of an inverted V cross section with the base lying along or in contact with the surfaces 26 and 27. With any type of belt it is arranged with the inclined side walls sloping inwardly in a radially outward direction. Said inclined walls are therefore, in a position to be engaged by the walls 20 on the members 15 and 16. The parts are so proportioned and shaped that when the members 15 and 16 are clamped together the belt member 28 is clamped in position preferably under a slight compression in order to prevent any looseness of the coupling.

The members 15 and 16 are provided respectively with radial inward extension walls 29 and 30. Said walls, as best shown in Figure 2, overlap the projections 25 in slight axially spaced relation with respect thereto. Said walls hold the hub member 22 against displacement or sloping in the case of unusual forces in an axial direction. It will be noted that with the cross section shown for the belt 28 the projections 25 of the hub member may oscillate about axes at right angles to the axis of the power shaft 21 or may move radially with respect to said axis without engaging any wall portions of the members 15 and 16. There is also sufficient room with the cross section of the belt, as shown, to provide for distortion of the material in the belt.

The two members 15 and 16 are clamped together by securing and reenforcing members 31 located on opposite sides of the plates and rigidly held together by rivets 32. Said members include reenforcing end portions 33 which extend downwardly over the inclined walls 20 at the points where the greatest radial and axial strain occurs on these walls. This construction permits any substantial deflection of the walls during operating of the coupling.

The members 15 and 16 are provided with small openings 34 at the outermost parts of the outwardly curved portions of the recess 19. These openings are for the purpose of draining accumulated water or oil from the coupling in any angular position or by centrifugal expulsion while in rotation.

The operation of the coupling as above described, was explained along with the description of the elements thereof. Power transmitted through the shaft 20 is carried through the outer structure consisting of the plates 15 and 16 through the flexible coupling member in the form of a belt 28 to the projections 25 on the hub member 22. It is to be understood that a coupling of this type might be connected to any two coaxially mounted rotatable members, and that it might take forms substantially different from that shown in the preferred embodiment as illustrated in the drawings.

Applicant claims as his invention:

1. A flexible shaft coupling comprising a hub member having a plurality of equally spaced radial projections, each projection being curved around at its projecting end and the projections being joined by curved valleys therebetween, a generally annular structure surrounding said hub member and provided with a sinuous recess therein following said projections and said valleys in spaced relation radially and overlapping the projections slightly spaced in an axial direction therefrom, said recess being partially formed by side walls inclined toward each other in a radially outward direction and a V-belt with angled side walls arranged in a sinuous manner over the projections on the hub member and in the recess of the annular structure and contacting at least the circular portions of the projections and having its angled side walls contacting the inclined side walls of the recess.

2. A flexible shaft coupling comprising an inner structure, an outer structure and a connecting element, said inner structure consisting of a member having a plurality of equally spaced projections extending therefrom in a radial direction, each projection being circular at its projecting end, said outer structure including two generally annular members having contacting portions and being shaped to provide a sinuous recess including portions surrounding said projections and slightly spaced in an axial direction therefrom and portions extending inwardly between the projections, said recess being formed by inclined walls on the annular members extending together in a radial outward direction, means for securing said annular members together, and said connecting element being a V-belt having angled side walls arranged in a sinuous manner over the projections and in the recess, said belt contacting at least the circular portions of the projections and being positioned with its angled side walls contacting the inclined walls of the inwardly projecting portions of the recess.

3. A flexible shaft coupling comprising a hub member having a plurality of equally spaced radial projections, each projection being curved around at its projecting end and the projections being joined by curved valleys therebetween, two generally annular members having mating contacting portions and spaced apart portions surrounding said projections in spaced relation radially and slightly spaced in an axial direction therefrom, said spaced apart portions being joined to the contacting portions by recess-forming walls, said walls having radially inwardly extending portions spaced from the curved valleys of the hub member, means for securing said annular members together including headed elements and reenforcing members extending radially inwardly over the recess-forming walls; and a belt arranged in a sinuous manner over the projections on the hub member and the inwardly extending portions of the walls on the annular members contacting at least the circular portions of the projections and the inwardly projecting portions of the recess-forming walls on the annular members.

4. A flexible shaft coupling comprising a hub member having a plurality of equally spaced radial projections, each projection being curved around at its projecting end and the projections being joined by curved valleys therebetween, two generally annular members having mating contacting portions and spaced apart portions surrounding said projections in spaced relation radially and slightly spaced in an axial direction therefrom, said spaced apart portions being joined to the contacting portions by inclined walls, said inclined walls having radially inwardly extending portions spaced from the curved valleys of the hub member, means for securing said annular members together, and a belt arranged in a sinuous manner over the projections on the hub member and the inwardly extending portions of the inclined walls on the annular members contacting at least the circular portions of the projections and having angled side walls contacting the inwardly projecting portions of the inclined walls on the annular members.

5. A flexible shaft coupling comprising a hub member having a plurality of equally spaced radial projections, each projection being curved around at its projecting end and the projections being joined by curved valleys therebetween, two generally annular members having mating contacting portions and spaced apart portions surrounding said projections in spaced relation radially and slightly spaced in an axial direction therefrom, said spaced apart portions being joined to the contacting portions by inclined walls, said inclined walls having radially inwardly extending portions spaced from the curved valleys of the hub member, means for securing said annular members together including headed elements and reenforcing members extending radially inwardly over the inclined walls, and a belt arranged in a sinuous manner over the projections on the hub member and the inwardly extending portions of the inclined walls on the annular members contacting at least the circular portions of the projections and having angled side walls contacting the inwardly projecting portions of the inclined walls on the annular members.

STUART D. POOL.

REFERENCES CITED

The following references are of record in the file of this patent:

UNITED STATES PATENTS

| Number | Name | Date |
|---|---|---|
| 288,134 | Stone, Jr. | Nov. 6, 1883 |
| 1,488,740 | Dobbins | Apr. 1, 1924 |
| 1,803,937 | Jansson | May 5, 1931 |
| 1,854,436 | Witry et al. | Apr. 19, 1932 |
| 1,941,061 | Thiry | Dec. 26, 1933 |
| 1,954,190 | Zeder | Apr. 10, 1934 |

FOREIGN PATENTS

| Number | Country | Date |
|---|---|---|
| 101,645 | Australia | 1937 |